(12) United States Patent
Yang et al.

(10) Patent No.: US 12,432,233 B1
(45) Date of Patent: Sep. 30, 2025

(54) ADAPTIVE ANOMALY CONTEXT DESCRIPTION

(71) Applicant: Intellective Ai, Inc., Addison, TX (US)

(72) Inventors: Tao Yang, Katy, TX (US); Ming-Jung Seow, The Woodlands, TX (US); Gang Xu, Houston, TX (US)

(73) Assignee: Intellective Ai, Inc., Dallas, TX (US)

( * ) Notice: Subject to any disclaimer, the term of this patent is extended or adjusted under 35 U.S.C. 154(b) by 0 days.

(21) Appl. No.: 17/240,168

(22) Filed: Apr. 26, 2021

Related U.S. Application Data

(63) Continuation of application No. 15/914,211, filed on Mar. 7, 2018, now abandoned, which is a continuation-in-part of application No. 15/135,404, filed on Apr. 21, 2016, now abandoned, and a continuation-in-part of application No. 15/135,382, filed on Apr. 21, 2016, now abandoned.

(60) Provisional application No. 62/318,977, filed on Apr. 6, 2016.

(51) Int. Cl.
*H04L 9/40* (2022.01)
*G06N 20/00* (2019.01)
*H04L 43/062* (2022.01)
*H04L 43/08* (2022.01)
*H04L 67/10* (2022.01)

(52) U.S. Cl.
CPC ......... *H04L 63/1425* (2013.01); *G06N 20/00* (2019.01); *H04L 43/062* (2013.01); *H04L 43/08* (2013.01); *H04L 67/10* (2013.01)

(58) Field of Classification Search
CPC ... H04L 63/1425; H04L 43/062; H04L 43/08; H04L 67/10; G06N 20/00
See application file for complete search history.

(56) References Cited

U.S. PATENT DOCUMENTS

| | | | |
|---|---|---|---|
| 5,768,552 A | 6/1998 | Jacoby | |
| 7,016,313 B1 | 3/2006 | Harper | |
| 8,966,503 B1 | 2/2015 | Dyer et al. | |
| 9,516,053 B1 * | 12/2016 | Muddu | H04L 41/22 |
| 2004/0025044 A1 | 2/2004 | Day | |
| 2006/0123477 A1 | 6/2006 | Raghavan et al. | |
| 2007/0289013 A1 | 12/2007 | Lim | |
| 2011/0099133 A1 * | 4/2011 | Chang | G06F 16/353 706/12 |

(Continued)

OTHER PUBLICATIONS

Advisory Action for U.S. Appl. No. 15/914,211 dated Sep. 10, 2020, 3 pages.

(Continued)

*Primary Examiner* — Techane Gergiso
(74) *Attorney, Agent, or Firm* — COOLEY LLP

(57) ABSTRACT

Techniques are disclosed for providing a context-aware description of anomalous behavior in a computer network. According to one embodiment of the present disclosure, a description of an anomaly detected in computer network activity is received. The description includes one or more features of the computer network associated with the anomaly. Contextual information relating to at least one of the features is generated based on a logical network topology. The logical network topology specifies a plurality of network traffic attributes of the computer network. An alert that includes a second description of the anomaly and the contextual information is generated.

19 Claims, 7 Drawing Sheets

(56) References Cited

U.S. PATENT DOCUMENTS

| | | | |
|---|---|---|---|
| 2012/0233311 A1 | 9/2012 | Parker et al. | |
| 2013/0104236 A1 | 4/2013 | Ray et al. | |
| 2013/0152092 A1 | 6/2013 | Yadgar | |
| 2013/0305357 A1* | 11/2013 | Ayyagari | H04L 41/069 726/22 |
| 2014/0115706 A1* | 4/2014 | Silva | G06F 9/45533 726/23 |
| 2014/0143868 A1* | 5/2014 | Shiva | G06F 21/552 726/23 |
| 2014/0215621 A1* | 7/2014 | Xaypanya | H04L 63/145 726/23 |
| 2014/0351106 A1* | 11/2014 | Furr | H04M 15/8214 705/34 |
| 2015/0033086 A1* | 1/2015 | Sasturkar | G06F 11/079 714/57 |
| 2015/0047040 A1* | 2/2015 | Cobb | G06F 40/242 726/23 |
| 2015/0081890 A1* | 3/2015 | Richards | H04L 43/0894 709/224 |
| 2015/0172203 A1 | 6/2015 | DeCusatis et al. | |
| 2015/0256413 A1* | 9/2015 | Du | H04L 41/145 370/242 |
| 2016/0028762 A1 | 1/2016 | Di Pietro et al. | |
| 2016/0142262 A1* | 5/2016 | Werner | H04L 41/22 709/224 |
| 2016/0170964 A1* | 6/2016 | Xu | G06F 40/289 704/10 |
| 2016/0171096 A1* | 6/2016 | Seow | G06F 18/23 707/738 |
| 2016/0212171 A1* | 7/2016 | Senanayake | G06F 3/013 |
| 2016/0219065 A1 | 7/2016 | Dasgupta et al. | |
| 2016/0219078 A1* | 7/2016 | Porras | H04L 41/22 |
| 2016/0261465 A1 | 9/2016 | Gupta et al. | |
| 2016/0352765 A1* | 12/2016 | Mermoud | H04L 63/1458 |
| 2017/0034192 A1 | 2/2017 | Schulman et al. | |
| 2017/0063912 A1 | 3/2017 | Muddu et al. | |
| 2017/0078170 A1 | 3/2017 | Vasseur et al. | |
| 2017/0099309 A1* | 4/2017 | Di Pietro | H04L 63/1425 |
| 2017/0104773 A1 | 4/2017 | Flacher et al. | |
| 2017/0104774 A1 | 4/2017 | Vasseur et al. | |
| 2017/0126709 A1* | 5/2017 | Baradaran | H04L 63/1441 |
| 2017/0134243 A1* | 5/2017 | Lévesque | H04L 41/22 |
| 2017/0148183 A1* | 5/2017 | Saitwal | G06T 7/60 |
| 2017/0244607 A1 | 8/2017 | Dujodwala et al. | |
| 2017/0279660 A1* | 9/2017 | Muntés-Mulero | H04L 41/12 |
| 2017/0279687 A1 | 9/2017 | Muntes-Mulero et al. | |
| 2017/0286284 A1* | 10/2017 | Risinger | G06F 3/0644 |
| 2017/0286800 A1* | 10/2017 | Saitwal | G06V 10/82 |
| 2017/0286863 A1* | 10/2017 | Seow | G06N 3/02 |
| 2017/0287104 A1* | 10/2017 | Risinger | G06V 20/41 |
| 2017/0295068 A1 | 10/2017 | Yang et al. | |
| 2017/0295193 A1* | 10/2017 | Yang | H04L 41/122 |

OTHER PUBLICATIONS

Final Office Action for U.S. Appl. No. 15/914,211 dated May 26, 2020, 11 pages.

Non-Final Office Action for the U.S. Appl. No. 15/135,382 dated Nov. 15, 2017, 12 pages.

Non-Final Office Action for the U.S. Appl. No. 15/135,404 dated Sep. 8, 2017, 8 pages.

Non-Final Office Action for the U.S. Appl. No. 15/914,211 dated Aug. 21, 2019, 8 pages.

Non-Final Office Action for the U.S. Appl. No. 15/914,211 dated Nov. 25, 2020, 14 pages.

\* cited by examiner

ADAPTIVE ANOMALY CONTEXT DESCRIPTION

CROSS-REFERENCE TO RELATED APPLICATIONS

This application is a continuation of U.S. application Ser. No. 15/914,211, filed Mar. 7, 2018 and titled "ADAPTIVE ANOMALY CONTEXT DESCRIPTION," which is a continuation-in-part of U.S. application Ser. No. 15/135,404, filed Apr. 21, 2016, entitled "ADAPTIVE ANOMALY CONTEXT DESCRIPTION," which in turn claims priority to and the benefit of U.S. Provisional Application Ser. No. 62/318,977, filed Apr. 6, 2016, entitled "LOGICAL NETWORK TOPOLOGY ANALYZER," and which is also a continuation-in-part of U.S. application Ser. No. 15/135,382, filed Apr. 21, 2016, entitled "LOGICAL NETWORK TOPOLOGY ANALYZER," which in turn claims priority to and the benefit of U.S. Provisional Application Ser. No. 62/318,977, filed Apr. 6, 2016, entitled "LOGICAL NETWORK TOPOLOGY ANALYZER"; the entirety of each of the aforementioned applications is hereby expressly incorporated by reference for all purposes.

FIELD

Embodiments of the present disclosure generally relate to computer networking. More specifically, embodiments presented herein provide techniques for building a logical network topology based on patterns of behavior from monitoring computer networks.

BACKGROUND

A computer network allows interconnected computing systems to communicate with one another. The computer network can include security features.

One embodiment presented herein discloses a method for providing a context-aware description of anomalous behavior in a computer network. The method generally includes receiving a first description of an anomaly detected in computer network activity. The first description includes one or more features of the computer network associated with the detected anomaly. The method also includes generating contextual information relating to at least one of the features based on a logical network topology. The logical network topology specifies a plurality of network traffic attributes of the computer network. An alert is generated, which includes a second description of the anomaly and the contextual information relating to the features.

Another embodiment presented herein discloses a non-transitory computer-readable storage medium storing instructions, which, when executed, perform an operation for providing a context-aware description of anomalous behavior in a computer network. The operation itself generally includes receiving a first description of an anomaly detected in computer network activity. The first description includes one or more features of the computer network associated with the detected anomaly. The operation also includes generating contextual information relating to at least one of the features based on a logical network topology. The logical network topology specifies a plurality of network traffic attributes of the computer network. An alert is generated, which includes a second description of the anomaly and the contextual information relating to the features.

Yet another embodiment presented herein discloses a system having a processor and a memory. The memory stores program code, which, when executed on the processor, performs an operation for providing a context-aware description of anomalous behavior in a computer network. The operation itself generally includes receiving a first description of an anomaly detected in computer network activity. The first description includes one or more features of the computer network associated with the detected anomaly. The operation also includes generating contextual information relating to at least one of the features based on a logical network topology. The logical network topology specifies a plurality of network traffic attributes of the computer network. An alert is generated, which includes a second description of the anomaly and the contextual information relating to the features.

One embodiment presented herein discloses a method for generating a logical network topology in a computer network. The method generally includes monitoring traffic activity in the computer network. The method also generally includes identifying one or more network traffic attributes of the computer network based on the monitored traffic activity. The logical network topology is built from the one or more network traffic attributes.

Another embodiment presented herein discloses a non-transitory computer-readable storage medium storing instructions, which, when executed, perform an operation for generating a logical network topology in a computer network. The operation itself generally includes monitoring traffic activity in the computer network. The operation also generally includes identifying one or more network traffic attributes of the computer network based on the monitored traffic activity. The logical network topology is built from the one or more network traffic attributes.

Yet another embodiment presented herein discloses a system having a processor and a memory. The memory stores program code, which, when executed on the processor, performs an operation for generating a logical network topology in a computer network. The operation itself generally includes monitoring traffic activity in the computer network. The operation also generally includes identifying one or more network traffic attributes of the computer network based on the monitored traffic activity. The logical network topology is built from the one or more network traffic attributes

BRIEF DESCRIPTION OF THE DRAWINGS

So that the manner in which the above recited features, advantages, and objects of the present disclosure are attained and can be understood in detail, a more particular description of the disclosure, briefly summarized above, may be had by reference to the embodiments illustrated in the appended drawings.

Note, however, that the appended drawings illustrate only typical embodiments of the present disclosure and are therefore not to be considered limiting of its scope, for the present disclosure may admit to other equally effective embodiments.

DETAILED DESCRIPTION

Figure 1:
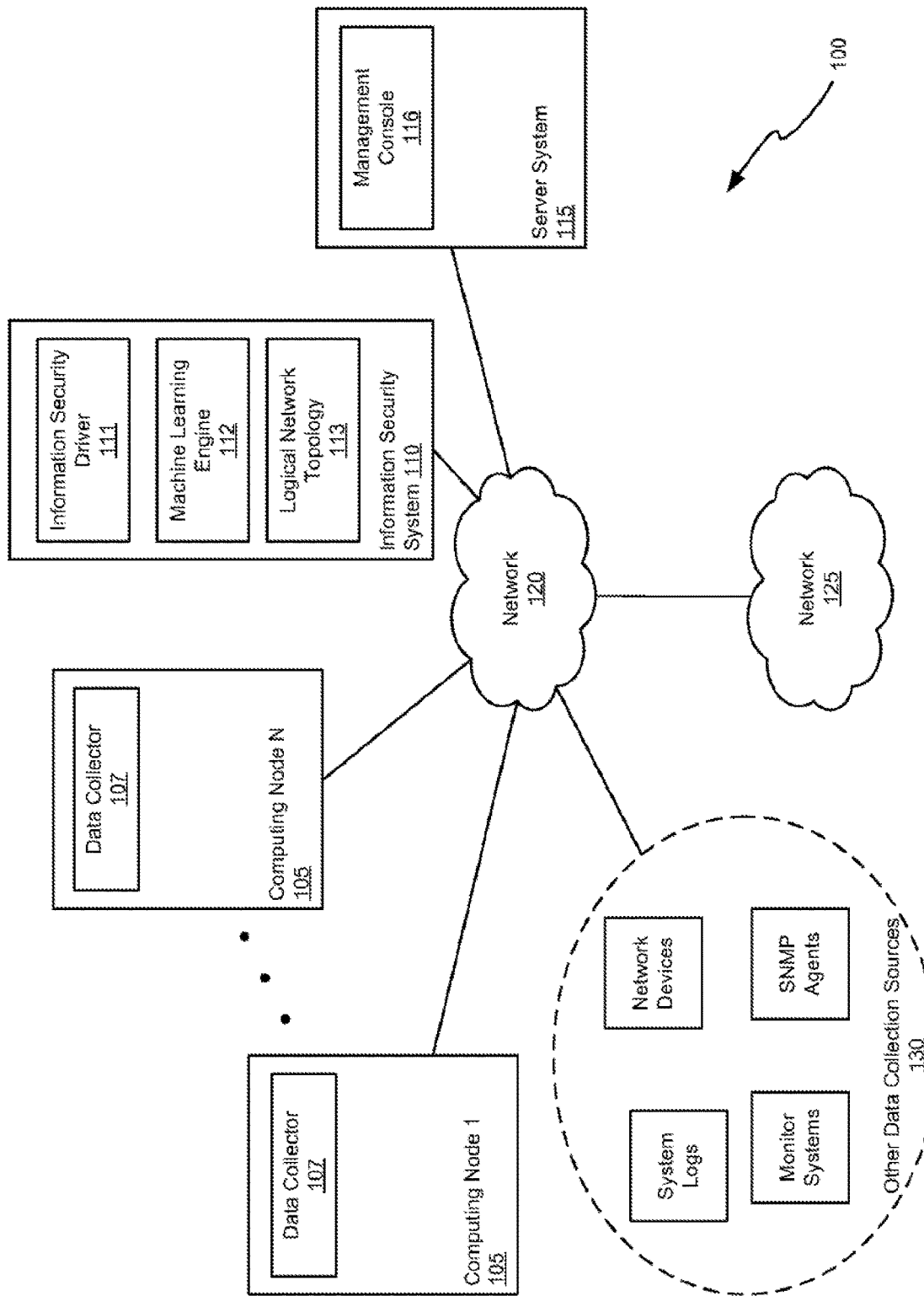
FIG. 1 illustrates an example computing environment, according to one embodiment.

A computer network may include an intrusion detection system (IDS) that monitors network or system activity for malicious activities or violations within the network and produces reports to a management console. Generally, an IDS is signature-based, i.e., the IDS may be configured with signatures to detect malicious or unwanted activity. As known, an attack signature is a sequence of computer activities (or alterations to those activities) corresponding to a known attack, e.g., towards a vulnerability in an operating system or application.

For example, an IDS may be configured with an attack signature that detects a particular virus in an e-mail message. The signature may contain information about subject field text included in previous e-mails that have contained the virus or attachment filenames in the past. With the signature, the IDS can compare the subject of each e-mail with subjects contained in the signature and also attachments with known suspicious filenames.

However, a signature-based approach raises several concerns. For example, although an IDS may possible detect alterations to a particular attack, the alternations typically need to be defined in the signature to do so. Similarly, because attack signatures are predefined, the IDS is susceptible to new attacks that have not yet been observed, e.g., 0-day attacks.

Embodiments presented herein disclose techniques for building a logical network topology based on observed traffic occurring within a given computer network. In particular, the techniques are for automatically learning and mapping network attributes to the network. Network attributes can include connectivity patterns (e.g., of a given node to another node in the network), intensity patterns (patterns of traffic volume in bi-directions), and frequency patterns (patterns of data exchange frequency in bi-directions).

For example, an information security system includes a machine learning engine that uses a neuro-linguistic model to learn patterns of behavior based on network activity may be situated in the computer network. The machine learning engine analyzes the network activity (e.g., network data streams) to identify recurring behavioral patterns. The machine learning engine learns normal activity occurring over a computer network based on various data collectors executing in the system. As a result, the machine learning may detect network activity that is abnormal based on what has been observed as normal activity, without needing to rely on training data or predefined attack signatures.

In one embodiment, a driver in the information security system generates the logical network topology from the monitored and analyzed network activity over time. For instance, the driver may detect an incoming packet (e.g., a packet being received at a node in the computer network). The driver processes the packet. e.g., by identifying address, protocol, and identifier information in the packet header, and categorizes the processed information. The driver may then evaluate the processed information relative to other previously observed data. Using the observed data, the driver builds (or updates) the logical network topology, e.g., by mapping traffic attributes to a given node or connection between nodes. Advantageously, the logical network topology provides a context and pattern of actual network traffic both in real-time and over time.

In one embodiment, information security driver may use the logical network topology to provide context to an end-user when generating an alert in the event that the machine learning engine observes an anomaly in monitored network activity. Generally, the machine learning engine generates raw anomaly data that is not initially human-readable. For example, the raw anomaly data may include low-level identifier information and values associated with the anomalous activity occurring in the network. For instance, the identifier information and feature values might represent that a rate of ICMP packets being sent to a node is higher than previously observed. The information security driver translates the alert data to human-readable format.

For example, the information security driver may provide mappings of identifiers and feature values to corresponding network components (e.g., in data collector modules of the information security driver). The mappings allow the information security driver to translate the alert data to reference the corresponding network components. Once translated, the information security driver may further generate context-aware descriptions associated with each of the network component in the alert data. For example, a context-aware description may provide the user with information alerting on "TCP traffic of four megabytes at time 16:27:33 on Jun. 3, 2015 between node <IP=192.168.2.33. MAC=00:3e:e1: c5:3e:c3, port=50250> and node <IP=192.168.4.60, MAC=00:A0:C9:14:C4:29, port=50250>." In addition, the information security driver applies the logical network topology to the translated alert to provide further context. For example, the information security driver may generate further descriptions regarding typical traffic patterns associated with one of the nodes specified in the alert.

FIG. 1 illustrates a computing environment 100, according to one embodiment. As shown, computing environment 100 includes one or more computing nodes 1-N 105, an information security system 110, a server system 115, and networks 120 and 125. The network 120 may represent an intranet interconnecting the computing nodes 1-N 105, information security system 110, and server system 115 with one another via various networking devices (e.g., switches, routers, etc.). For example, the network 120 and interconnected components may represent an enterprise network, where computing nodes 1-N 105 are physical client devices and virtual computing instances. Further, the network 120 may connect to the network 125, which represents the Internet (thus allowing a given computing node to communicate with other computing systems outside the enterprise network).

In one embodiment, the information security system 110 includes an information security driver 111, a machine learning engine 112, and a logical network topology 113. And the server system 115 includes a management console 116. In one embodiment, the information security system 110 is a neuro-linguistic behavioral recognition system that learns patterns of network activity observed within the computing devices connected to network 120. Doing so allows the information security system 110 to distinguish normal activity and anomalous activity within the network.

As further described below, the information security driver 111 obtains data from a variety of computer nodes 105 and other data collection sources 130 connected via network 120. For example, the other data collection sources 130 include network devices, system logs, data from monitor systems (e.g. intrusion detection systems), and Sources can include system logs, network devices, packet traffic, datagram traffic, trap data, and the like. To do so, data collector modules executing in, e.g., computing nodes 105 (as data collector 107) or in network devices may be configured to obtain the data, format the data (e.g., using some standardized format, such as JSON), and send the formatted data to the information security driver 111.

For instance, the information security driver 111 may receive raw packet data associated with incoming and outgoing packet traffic, such as source addresses, destination addresses: etc. Other examples may include information related to disk mounts and physical accesses at a given node. For instance, if an individual inserts a flash drive into a USB port of a computing node or mounts an external hard disk drive to the system, the information security driver 111 may receive a stream of data corresponding to the event (e.g., as raw numbers and identifiers associated with the flash drive, USB port, etc.). The information security driver 111 extracts feature values from each individual data stream and formats the feature values to be readable to the machine learning engine 112.

In one embodiment, the machine learning engine 112 receives samples of feature value data for learning and analysis. The machine learning engine 112 learns, based on the samples, patterns of activity occurring within the network. Over time, the machine learning engine 112 is able to determine normal activity within the network, which in turn allows the machine learning engine 112 to detect anomalous activity in real-time based on the learned patterns. Once detected, the machine learning engine 112 may generate raw anomaly data and send the raw anomaly data to the information security driver 111, which in turn generates an alert based on the raw anomaly data. The information security driver 111 may then sent the alert to the management console 116. In turn, the management console 116 may present the alert via a user interface that a user, e.g., a network administrator, may view and evaluate.

In general, the raw anomaly data sent by the machine learning engine 112 to the information security driver 111 may be strings of low-level feature descriptors and values. Further, even if the network administrator was able to discern what the low-level features and values correspond to in the network, the administrator may have difficulty ascertaining why the alert was generated. To provide more meaningful alerts to a user, in one embodiment, the information security driver 111 may build a logical network topology 113 based on the observed network activity. The logical network topology includes observed network traffic attributes mapped to nodes 105 and network devices (e.g., physical and virtual switches, routers, and the like). To do so, the information security driver 111 monitors network activity and tracks patterns related to network traffic attributes in the monitored activity.

For instance, network traffic attributes may include connectivity patterns, e.g., where the information security driver 111 observes instances of a given node A communicating with a node B. and a node C at another observed rate. Network traffic attributes may also include intensity patterns that measure a pattern of traffic volume, e.g., where the information security driver 111 observes an amount of data being sent to/from a given node in the network. Another example of a network traffic attribute that the information security driver 111 may track is a frequency pattern, e.g., a pattern at which a node exchanges data in both directions. Further, network traffic attributes may include information regarding the patterns, e.g., the type of protocol used, source and destination addresses, etc. The information security driver 111 may associate the observed network traffic attributes with a corresponding node or network device.

Further still, over time, the information security driver 111 continuously updates the logical network topology as the driver 111 observes additional data. Doing so allows the information security driver 111 to provide a more robust context describing the enterprise network (e.g., to a network administrator) beyond using a physical network topology to describe which devices are connected to one another.

As stated, the machine learning engine may report raw anomaly data to the information security driver 111. The raw anomaly data can include an anomaly identifier, identifiers of features having abnormal activity occur, values for those features, timestamp data, and the like. As further described below, the information security driver 111 may generate a human-readable alert by translating the feature data provided in the raw anomaly data to corresponding network components (e.g., whether a feature corresponds to a network device ID, protocol name, etc.). Further, the information security driver 111 generates additional contextual information related to the anomaly based on data provided by the logical network topology.

For example, the machine learning engine 112 may generate an anomaly related to a given node A receiving ICMP packets from a node D. The logical network topology may indicate that node A does not normally communicate with node D during that period of time that the packets were sent. The logical network topology might also indicate that when node A and node D communicate, node D typically sends TCP/IP packets. The context information generated by the information security driver 111 may describe these indications. The information security driver 111 then sends the alert to the management console 116, which in turn presents the alert to the user. Advantageously, the alert provides a meaningful description that allows the user to better evaluate how to proceed further.

Figure 2:
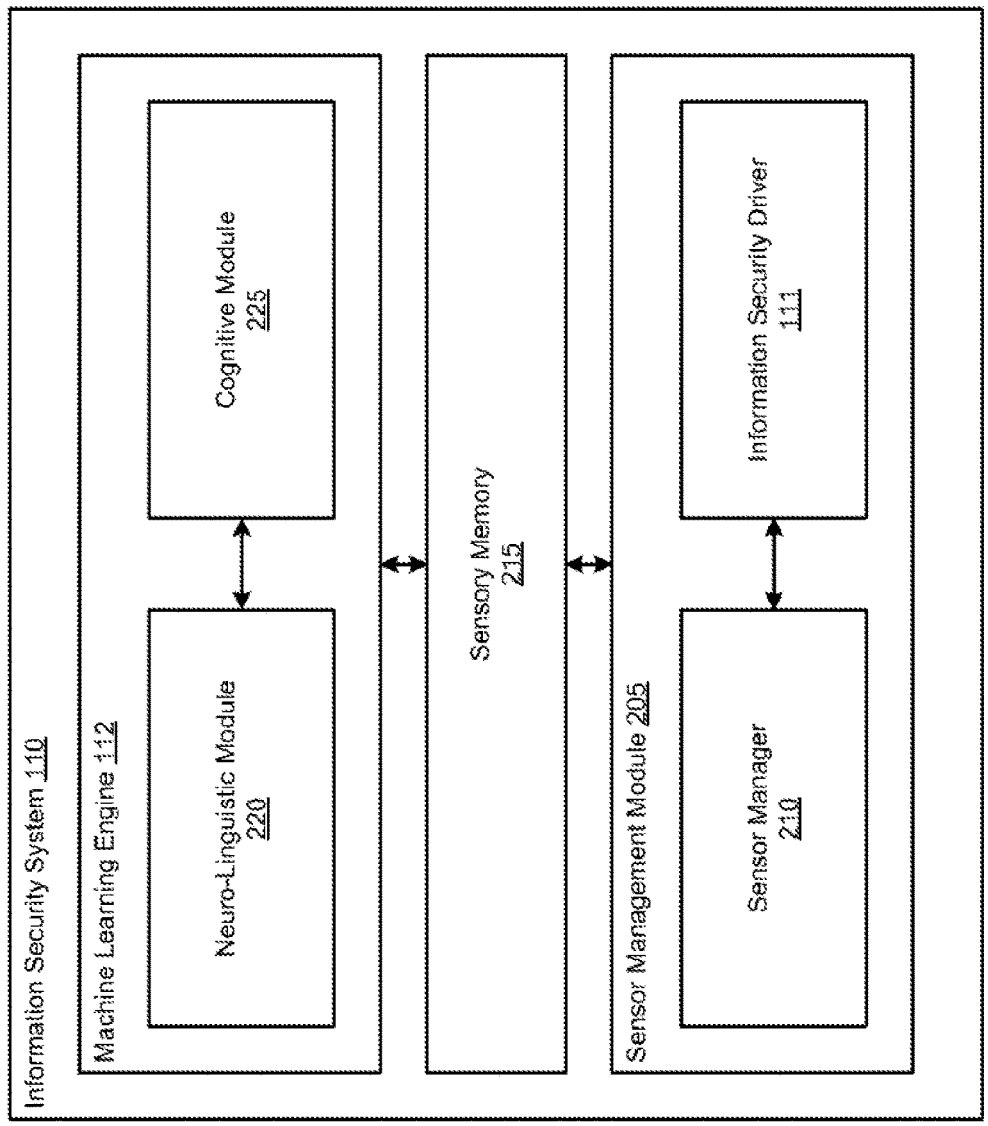
FIG. 2 further illustrates components of the information security system shown in FIG. 1, according to one embodiment.

FIG. 2 further illustrates the information security system 110, according to one embodiment. As shown, the information security system 110 further includes a sensor management module 205 and a sensory memory 215. In addition, the machine learning engine 112 further includes a neuro-linguistic module 220 and a cognitive module 225. And the sensor management module 205 further includes a sensor manager 210 and the information security driver 111.

In one embodiment, the sensor manager 210 specifies which computing nodes and network devices that the information security driver 111 should monitor (e.g., in response to a request sent by the management console 116). For example, if the management console 116 requests the information security system 110 to monitor activity at a given network address, the sensor manager 210 determines the computing node 105 configured at that location and directs the information security driver 111 to monitor that node 105.

In one embodiment, the sensory memory 215 is a data store that transfers large volumes of sampled feature data from the information security driver 111 to the machine learning engine 112. The sensory memory 215 stores the data as records. Each record may include an identifier, a timestamp, and a data payload. Further, the sensory memory 215 aggregates incoming data by time. Storing incoming data from the information security driver 111 in a single location allows the machine learning engine 112 to process the data efficiently. Further, the information security system 110 may reference data stored in the sensory memory 215 in generating alerts for anomalous activity. In one embodiment, the sensory memory 215 may be implemented in via a virtual memory file system. In another embodiment, the sensory memory 215 is implemented using a key-value pair.

In one embodiment, the neuro-linguistic module 220 performs neural network-based linguistic analysis of normalized input data to describe activity observed in the network data. As stated, rather than describing the activity based on pre-defined objects and actions, the neuro-linguistic module 220 develops a custom language based on symbols, e.g., letters, generated from the input data. The cognitive module 225 learns patterns based on observations and performs learning analysis on linguistic content developed by the neuro-linguistic module 220.

Figure 3:
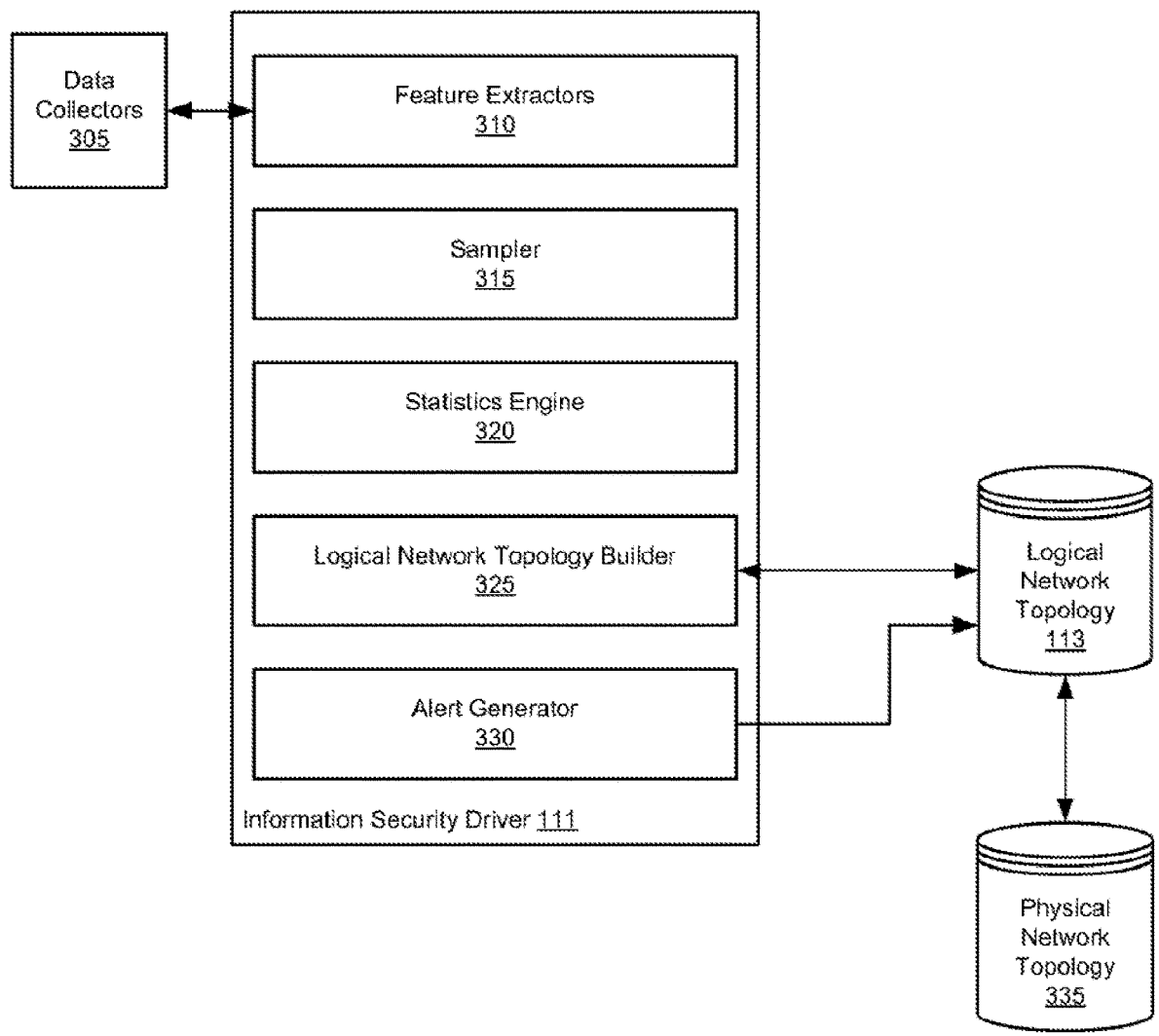
FIG. 3 further illustrates components of the information security driver shown in FIG. 1, according to one embodiment.

FIG. 3 further illustrates components of the information security driver 111, according to one embodiment. As shown, the information security driver includes one or more feature extractors 310, a sampler 315, a statistics engine 320: a logical network topology builder 325, and an alert generator 330.

In one embodiment, a data collector 305 is configured to obtain data from one or more sources. As stated, sources can include computer nodes, network devices, system logs, and the like. A given data collector 305 monitors traffic occurring at a source. For instance, the data collector 305 observes traffic data associated with the MAC address of a computing node. In addition, the data collector 305 determines statistical information of network traffic associated with the node, e.g., packets per second for a given connection.

In one embodiment, each feature extractor 310 is assigned to a given node 105. A given feature extractor 310 evaluates the raw packet data obtained from the data collector 305 and categorizes features identified in the packet data. For example, data collector 305 may evaluate a header of a packet in the traffic flow to identify various features. e.g., when the traffic data arrives (or is sent), which node or outside server that the node 105 is communicating with, which protocol is being used to communicate, a payload of the data, source and destination address information, etc.

Further, the feature extractor 310 may separate features into several components and determine feature values for each component. For instance, the feature extractor 310 may obtain MAC address information associated with a node and separate the MAC address into different components and assign feature values based on the actual value of the MAC address component.

In addition, the feature extractor 310 normalizes each the feature values to a value e.g., between 0 and 1, inclusive. In one embodiment, the sampler 315 generates a vector associated with each extracted feature, where the vector is a concatenation of feature values for the extracted network data. The sampler 315 packages the sample vector with information such as an identifier for the associated node, a timestamp, etc. Further, the sampler 315 formats the packaged sample vector such that the machine learning engine 112 may evaluate the values in the sample. The sampler 315 may send the sample vector to the sensory memory at a specified rate, e.g., once every second, once every five seconds, etc. As stated, the sensory memory 215 serves as a message bus for the information security driver 111 and the machine learning engine 112. The machine learning engine 112 may retrieve the sample vectors as needed.

In one embodiment, the feature extractors 310 may forward feature data to the statistics engine 320. The statistics engine 320 categorizes the feature data (e.g., packet rate, protocols used, node identifiers, etc.) and maintains a history of each of the categories of data. In one embodiment, the logical network topology builder 325 generates a logical network topology 113 from the observed network activity. To do so, the builder 325 evaluates the network activity relative to the historical statistics data and determines network traffic attributes (e.g., connectivity patterns, intensity patterns, frequency patterns, etc.). The logical network topology builder 325 may then map the patterns to a corresponding node 105. The builder 325 may persist the resulting logical network topology 113 in the information security system 110 for subsequently providing contextual information regarding the network, e.g., relative to a physical network topology 335 specifying a configuration of physical (and virtual) networking devices in the enterprise network, relative to an alert generated from an anomaly observed by the machine learning engine 112.

In one embodiment, the alert generator 330 receives anomaly data from the machine learning engine 112 when the machine learning engine 112 detects anomalous events in the network activity. The alert generator 330 generates alert media that includes a human-readable description of the anomaly, e.g., by translating the anomaly using a mapping between a feature reported by the machine learning engine 112 and the corresponding network component. Further, in one embodiment, the alert generator 330 may also generate context information based on the data provided by the logical network topology 113. For example, the context information may include network traffic attributes. e.g., traffic patterns of connectivity, intensity, frequency, etc. associated with the nodes specified in the alert. The alert generator 330 may then send the generated alert media to the management console 116.

Figure 4:
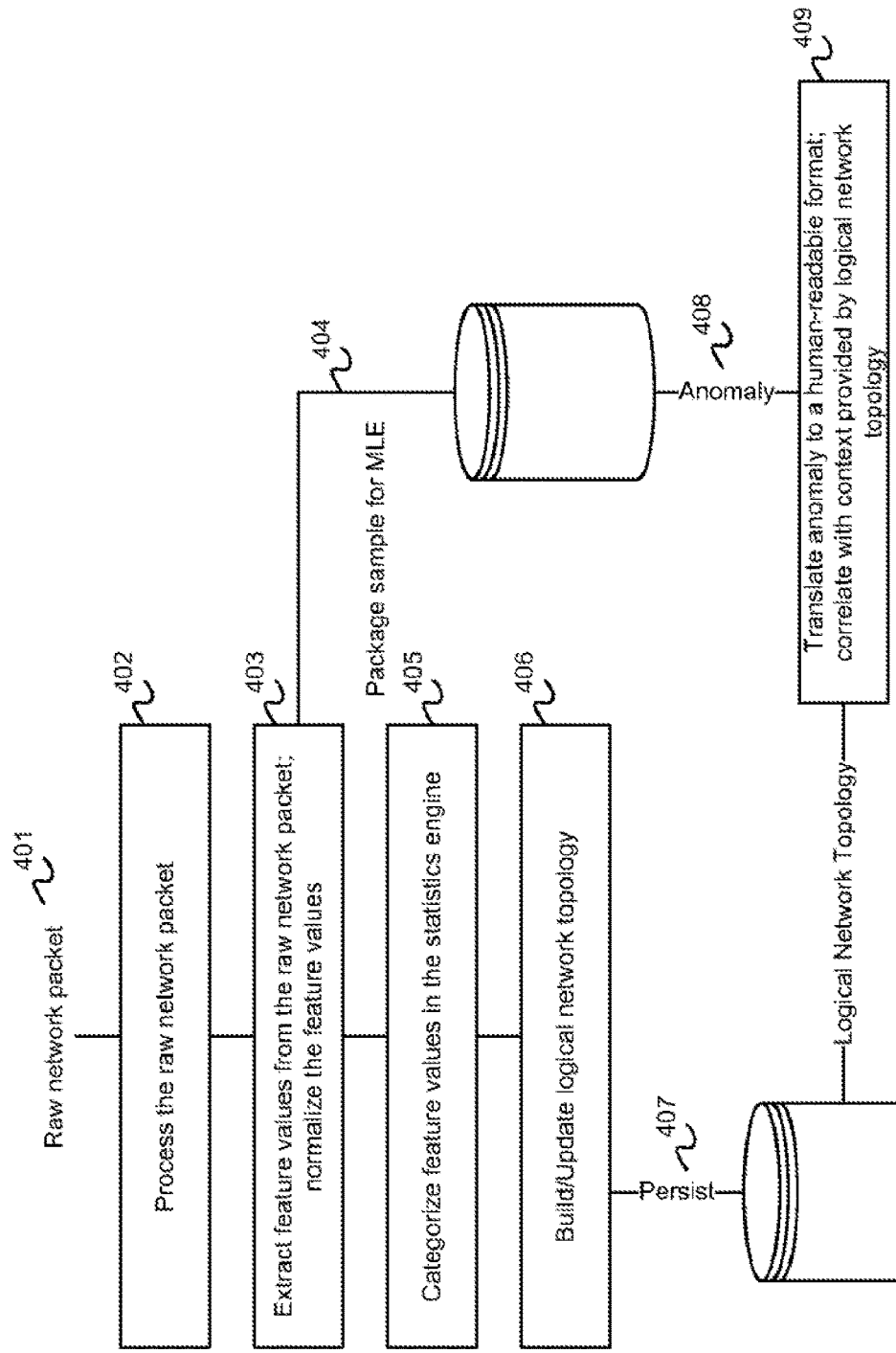
FIG. 4 illustrates a flow diagram of generating and applying a logical network topology within an information security system, according to one embodiment.

FIG. 4 illustrates a flow diagram of generating and applying a logical network topology, according to one embodiment. As stated, a data collector 305 may observe network activity and collect data related to a source (e.g., incoming packets at a given node). At 401, the data collector 305 observes a raw network packet directed at a node 105. At 402, the feature extractor 310 extracts feature values from the network packet. To do so, at 403, the feature extractor 310 may evaluate the packet header to identify various information, e.g., source and destination identifiers, protocols used (e.g., TCP. UDP, ICMP, etc.), etc. Feature values may also include timestamps and statistics data. At 404, the sampler 315 packages a resulting feature vector into a sample including timestamp and identifier information for analysis by the machine learning engine 112.

At 405, the statistics engine 320 analyzes the features extracted from the network packet and updates historical network statistics based on the features. At 406, the logical network topology builder 325 builds (or updates) the logical network topology based on network traffic attributes identified in the statistics data. At 407, the logical network topology builder 325 persists the logical network topology in memory.

At 408, the machine learning engine 112 may detect an anomaly in the observed network activity, i.e., patterns of data that deviate from previously observed patterns. The machine learning engine 112 sends the anomaly data to the information security driver 111. For example, the anomaly data may specify a timestamp and a number of feature identifiers with corresponding values.

At 409, the alert generator 330 translates the anomaly to a human-readable format. For example, the alert generator 330 may convert each feature identifier to a corresponding network component (e.g., a component of a MAC address, device identifier, protocol identifier, etc.). In addition, the alert generator 330 generates a context description based on the data provided by the logical network topology 113, e.g., previously observed frequency, intensity, and connectivity patterns relevant to the alert. For example, the context description may indicate that a given node previously received few packets from a particular computing system, relative to an alert indicating that the node received a significantly large number of packets from that computing system.

Figure 5:
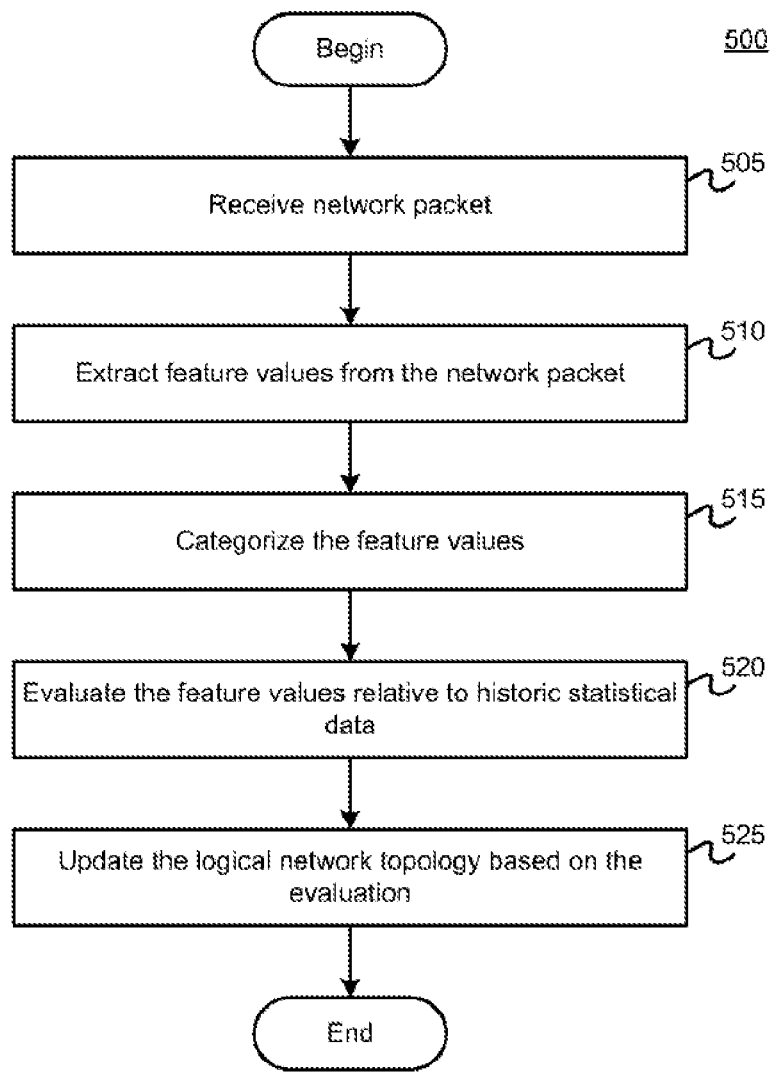
FIG. 5 illustrates a method for generating a logical network topology, according to one embodiment.

FIG. 5 illustrates a method 500 for generating a logical network topology, according to one embodiment. As shown, the method 500 begins at step 505, where the data collector 505 receives a raw network packet having a destination identifier corresponding to a given node 105.

At step 510, the corresponding feature extractor 510 identifies features in the network packet. As stated, the features can include statistics data, source and destination address information, network protocol, node identifiers, payload information, and the like. Further, the feature extractor 510 determines corresponding feature values.

At step 515, the statistics engine 320 categorizes the feature values and updates historical network statistics. The statistics engine 320 maintains the historical network statistics in a data store for later reference. At step 520, the logical network topology builder 325 evaluates feature values relative to the historical network statistics. Doing so allows the logical network topology builder 325 to identify patterns in the network activity associated with the node (and other devices in the network).

At step 525, the logical network topology builder 325 builds or updates the logical network topology based on the evaluation. To do so, the logical network topology builder 325 maps network traffic attributes, such as traffic flow patterns, to the node 105. The logical network topology builder 325 may then persist the data in memory.

Figure 6:
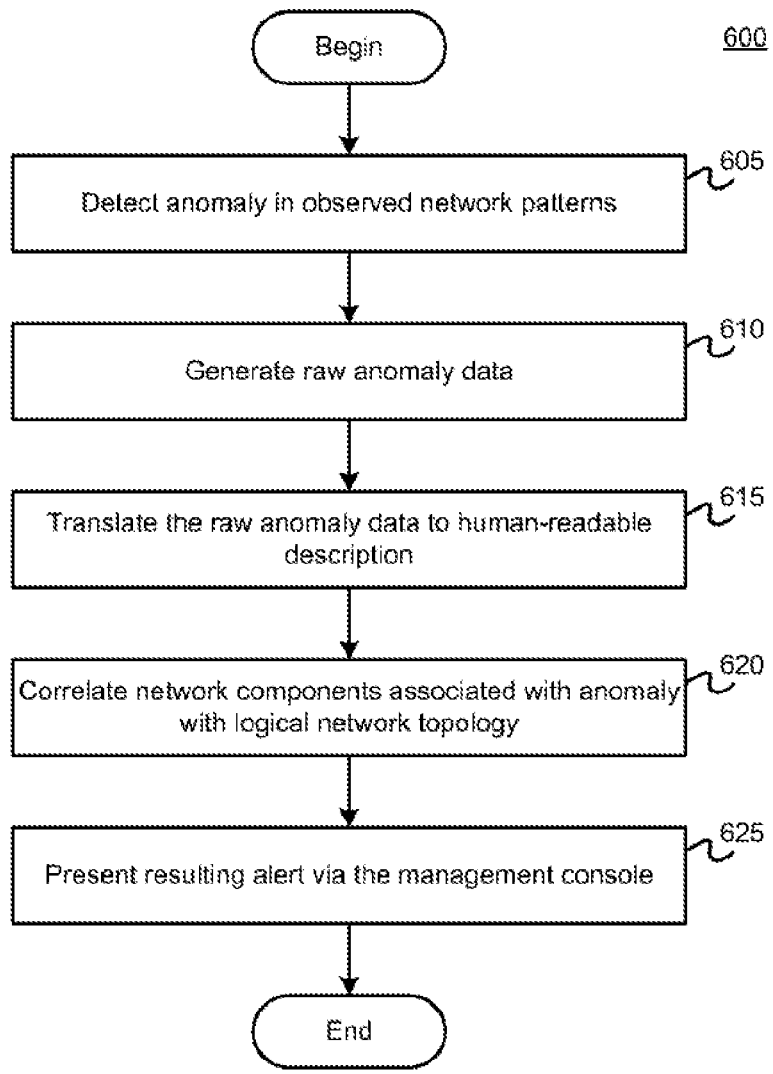
FIG. 6 illustrates a method for adaptively applying logical network topology data to an observed anomaly, according to one embodiment.

FIG. 6 illustrates a method 600 for adaptively applying logical network topology data to an observed anomaly, according to one embodiment. As shown, method 600 begins at step 605, where the machine learning engine 112 detects an anomaly in the observed patterns sent by the information security driver 111, e.g., neuro-linguistic phrases that have not been previously observed. At step 610, the machine learning engine 112 generates raw anomaly data that may include a timestamp, an identifier associated with the anomaly, identifiers of features associated with the anomaly, and corresponding values to those features. The machine learning engine 112 sends the raw anomaly data to the alert generator 330.

As stated, because the raw anomaly data may contain strings and values that are otherwise undiscernible by a user, at step 615, the alert generator 330 translates the raw anomaly data to a human-readable description. To do so, the alert generator 330 may convert feature identifiers and values to corresponding network components based on mappings initially used by the feature extractors 310 to generate feature data. For example, a specified feature ID and value can be translated to a protocol type used in the communication that resulted in the anomaly.

At step 620: the alert generator 330 correlates the network components associated with the anomaly with the logical network topology 113 to identify contextual information to associate with the anomaly. For example, assume that the anomaly specifies a node A transferring TCP/IP packets to a node B. The alert generator 330, based on the correlations, may identify previously observed patterns of node A communicating with node B as well as the protocols used by node A. The contextual information may indicate that node A regularly communicates with node B but does so using UDP.

The alert generator 330 creates the alert that includes the translated description and contextual information. The alert generator 330 may then send the alert to the management console 116. At step 625, the management console 116 presents the alert via a user interface for an administrator to review.

Figure 7:
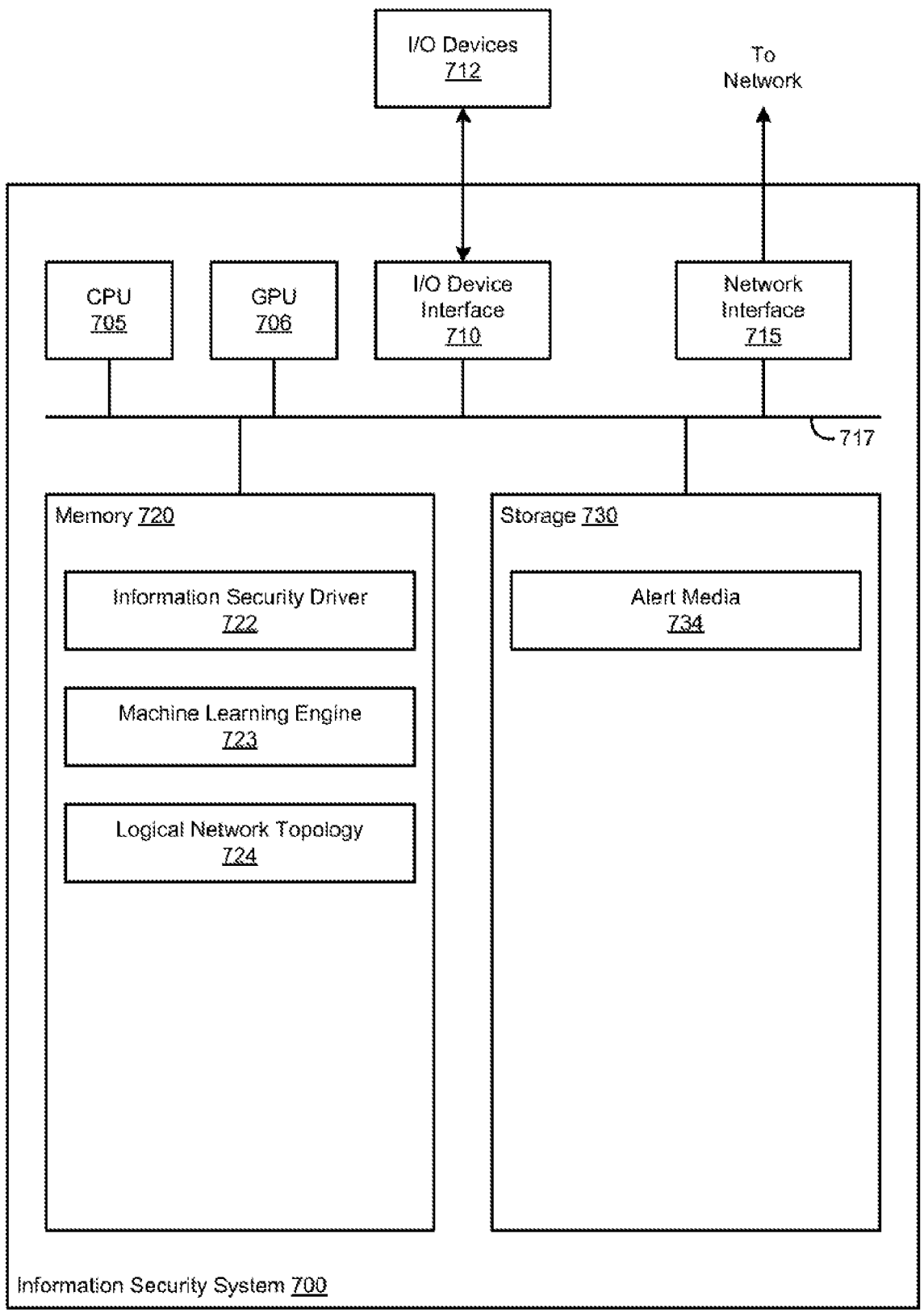
FIG. 7 illustrates an example computing system configured to generate a logical network topology, according to one embodiment.

FIG. 7 further illustrates the information security system 110, according to one embodiment. As shown, the information security system 110 includes, without limitation, a central processing unit (CPU) 705, a graphics processing unit (GPU) 706, a network interface 715, a memory 720, and storage 730, each connected to an interconnect bus 717. The information security system 110 may also include an I/O device interface 710 connecting V/O devices 712 (e.g., keyboard, display and mouse devices) to the information security system 110. Further, in context of this disclosure, the computing elements shown in information security system 110 may correspond to a physical computing system. In one embodiment, the information security system 110 is representative of a neuro-linguistic behavioral recognition system configured to detect anomalous activity in a computer network.

The CPU 705 retrieves and executes programming instructions stored in memory 720 as well as stores and retrieves application data residing in the memory 730. The interconnect bus 717 is used to transmit programming instructions and application data between the CPU 705, V/O devices interface 710, storage 730, network interface 715, and memory 720.

Note, CPU 705 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, optical storage, network attached storage (NAS), or a storage area-network (SAN).

In one embodiment, the GPU 706 is a specialized integrated circuit designed to accelerate graphics in a frame buffer intended for output to a display. GPUs are very efficient at manipulating computer graphics and are generally more effective than general-purpose CPUs for algorithms where processing of large blocks of data is done in parallel. Applications executing in the information security system 110 use the parallel processing capabilities of the GPU 706 to improve performance in handling large amounts of incoming data (e.g., network activity data) during each pipeline processing phase.

In one embodiment, the memory 720 includes the information security driver 722, a machine learning engine 723, and a logical network topology 724. And the storage 330 includes alert media 734. As discussed above, the information security driver 722 monitors network activity and processes feature data in observed packets to be sent to the machine learning engine 723 for analysis. The machine learning engine 723 performs neuro-linguistic analysis on values that are output by the information security driver 722 and learns patterns from the values. The machine learning engine 723 distinguishes between normal and abnormal patterns of activity and generates alerts (e.g., alert media 734) based on observed abnormal activity.

In one embodiment, the information security driver 722 generates the logical network topology 724 based on network traffic attributes observed in the network activity. For example, the information security driver 722 identifies patterns of the traffic flow, e.g., patterns of nodes communicating with other nodes at a given time, patterns of frequency at which nodes send a given amount of data to other nodes, and the like. The information security driver 722 may then map the network traffic attributes to a given node or network device (e.g., routers, switches, etc.) within the network. The information security driver 722 persists the logical network topology 724 in the memory 720.

In one embodiment, the machine learning engine 723 generates anomaly data when detecting abnormal network activity. The anomaly data is raw data that includes a string of features and corresponding values representing the observed abnormal network activity. The information security driver 722 receives the anomaly data from the machine learning engine 723 for display to a user, e.g., via a user interface on a management console. In one embodiment, prior to presenting the anomaly data to the user, the information security driver 722 generates alert media 734 that includes a human-readable description of the anomaly data as well as contextual information provided by the logical network topology 724. To do so, the information security driver 722 may translate the anomaly data to the human-readable description based on mappings used in translating network data to raw data for the machine learning engine 723. Further, the information security driver 722 correlate network components identified in the raw anomaly data with network traffic attributes (e.g., patterns) specified in the logical network topology 724. For example, the information security driver 722 may include contextual information describing a computing node or device specified in the anomaly (e.g., a traffic pattern normally observed for that node or device)

In the preceding, reference is made to embodiments of the present disclosure. However, the present disclosure is not limited to specific described embodiments. Instead, any combination of the following features and elements, whether related to different embodiments or not, is contemplated to implement and practice the techniques presented herein.

Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim (s).

Aspects presented herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments presented herein In this regard, each block in the flowchart or block diagrams may represent a module, segment or portion of code, which comprises one or more executable instructions for implementing the specified logical function(s). In some alternative implementations the functions noted in the block may occur out of the order noted in the figures.

For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments presented herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction Thus, cloud computing allows a user to access virtual computing resources (e.g., storage, data, applications, and even complete virtualized computing systems) in "the cloud," without regard for the underlying physical systems (or locations of those systems) used to provide the computing resources.

Embodiments presented herein describe techniques for generating a logical network topology and providing contextual information based on the logical network topology relative to anomalous behavior in a computer network. Advantageously, identifying network traffic attributes (e.g., patterns of network activity) and mapping those attributes to components in the computer network provide a more detailed context related to the interaction of nodes and network devices in the computer network, beyond a physical network topology configuration. Further, by including contextual information relating to network components involved in an anomaly, a resulting alert may provide more meaningful information that a user (e.g., a network administrator, information security operator, etc.) can better review.

While the foregoing is directed to embodiments of the present disclosure, other and further embodiments may be devised without departing from the basic scope thereof, and the scope thereof is determined by the claims that follow.

The invention claimed is:

1. A processor-implemented method for providing a context-aware description of anomalous behavior in a computer network, the method comprising:
   receiving a first description of an anomaly detected in computer network activity, the first description of the anomaly being generated using a neuro-linguistic behavioral recognition system that analyzes anomalous network behavior based at least in part on historical data, the first description of the anomaly including a neuro-linguistic representation of at least one network feature associated with the anomaly;
   generating contextual information relating to at least one feature from one or more features of the computer network based on a dynamically updated logical network topology that (1) is generated based on the computer network activity relative to historical statistics data of the computer network, (2) specifies a plurality of network traffic attributes of the computer network, and (3) is updated over time based on monitored network traffic activity;
   translating the first description of the anomaly into a second description of the anomaly that includes a natural language representation of the anomaly; and
   generating an alert that includes the second description of the anomaly, the contextual information relating to the one or more features, a representation of a network component in the computer network.

2. The processor-implemented method of claim 1, wherein the translating the first description of the anomaly into the second description of the anomaly is performed based on a mapping of (1) at least a first feature from the one or more features of the computer network to (2) the representation of the network component in the computer network.

3. The processor-implemented method of claim 1, further comprising:
   presenting the alert via a user interface.

4. The processor-implemented method of claim 1, wherein the plurality of network traffic attributes includes at least one of a connectivity pattern, a frequency pattern, or an intensity pattern associated with the network component in the computer network.

5. The processor-implemented method of claim 1, wherein the contextual information describes previously observed network traffic attributes associated with the network component in the computer network.

6. The processor-implemented method of claim 1, wherein the first description of the anomaly is generated without using at least one of training data or a predefined attack signature.

7. The processor-implemented method of claim 1, wherein the second description of the anomaly includes a description of a traffic pattern associated with a node of the computer network, the node being specified in the alert.

8. The processor-implemented method of claim 1, wherein the one or more features include one of: a packet rate, a computer protocol, or a node identifier.

9. The processor-implemented method of claim 1, wherein at least one of:
   the representation of the network component in the computer network includes one of a network device identifier, a protocol identifier, or a portion of a MAC address; or
   the first description of the anomaly includes a description generated using a machine learning engine.

10. A non-transitory computer-readable storage medium having storing instructions that, when executed on one or more processors, cause the one or more processors to:
    receive a first description of an anomaly detected in computer network activity, the first description of the anomaly being generated using a neuro-linguistic behavioral recognition system that analyzes anomalous network behavior based at least in part on historical data, the first description of the anomaly including a neuro-linguistic representation of at least one network feature associated with the anomaly;
    generate contextual information relating to at least one feature from one or more features of the computer network based on a dynamically updated logical network topology tat (1) is generated based on the computer network activity relative to historical statistics data of the computer network, (2) specifies a plurality of network traffic attributes of the computer network, and (3) is updated over time based on monitored network traffic activity;
    translate the first description of the anomaly into a second description of the anomaly that includes a natural language representation of the anomaly; and
    generate an alert that includes the second description of the anomaly, the contextual information relating to the one or more features, the and a representation of A network component in the computer network.

11. The non-transitory computer-readable storage medium of claim 10, wherein the instructions to translate the first description of the anomaly into the second description of the anomaly include instructions to translate the first description of the anomaly into the second description of the anomaly based on a mapping of (1) at least a first feature from the one or more features of the computer network to (2) the representation of the network component in the computer network.

12. The non-transitory computer-readable storage medium of claim 10, further storing instructions to cause the one or more processors to:
    present the alert via a user interface.

13. The non-transitory computer-readable storage medium of claim 10, wherein the plurality of network traffic attributes includes at least one of a connectivity pattern, frequency pattern, and an intensity pattern associated with the network component in the computer network.

14. The non-transitory computer-readable storage medium of claim 10, wherein the contextual information describes previously observed network traffic attributes associated with the network component in the computer network.

15. The non-transitory computer-readable storage medium of claim 10, wherein the first description of the anomaly is generated without using at least one of training data or a predefined attack signature.

16. A system, comprising:
    at least one processor; and
    a memory in communication with the at least one processor and storing code, that, when executed on the at least one processor, performs an operation comprising:
    receiving a first description of an anomaly detected in computer network activity, the first description of the anomaly being generated using a neuro-linguistic behavioral recognition system that analyzes anomalous network behavior based at least in part on historical data, the first description of the anomaly including a neuro-linguistic representation of at least one network feature associated with the anomaly;

generating contextual information relating to at least one feature from one or more features of the computer network based on a dynamically updated logical network topology that (1) is generated based on the computer network activity relative to historical statistics data of the computer network, (2) specifies a plurality of network traffic attributes of the computer network, and (3) is updated over time based on monitored network traffic activity;

translating the first description of the anomaly into a second description of the anomaly that includes a natural language representation of the anomaly; and generating an alert that includes the second description of the anomaly, the contextual information relating to the one or more features, and a representation of a network component in the computer network.

17. The system of claim 16, wherein the ep-translating the first description of the anomaly into the second description of the anomaly includes translating the first description of the anomaly into the second description of the anomaly based on a mapping of (1) at least a first feature from the one or more features of the computer network to (2) the representation of the network component in the computer network.

18. The system of claim 16, wherein the plurality of network traffic attributes includes at least one of a connectivity pattern, frequency pattern, and an intensity pattern associated with the network component in the computer network.

19. The system of claim 16, wherein the contextual information describes previously observed network traffic attributes associated with the network component in the computer network.

* * * * *